Figure 1:
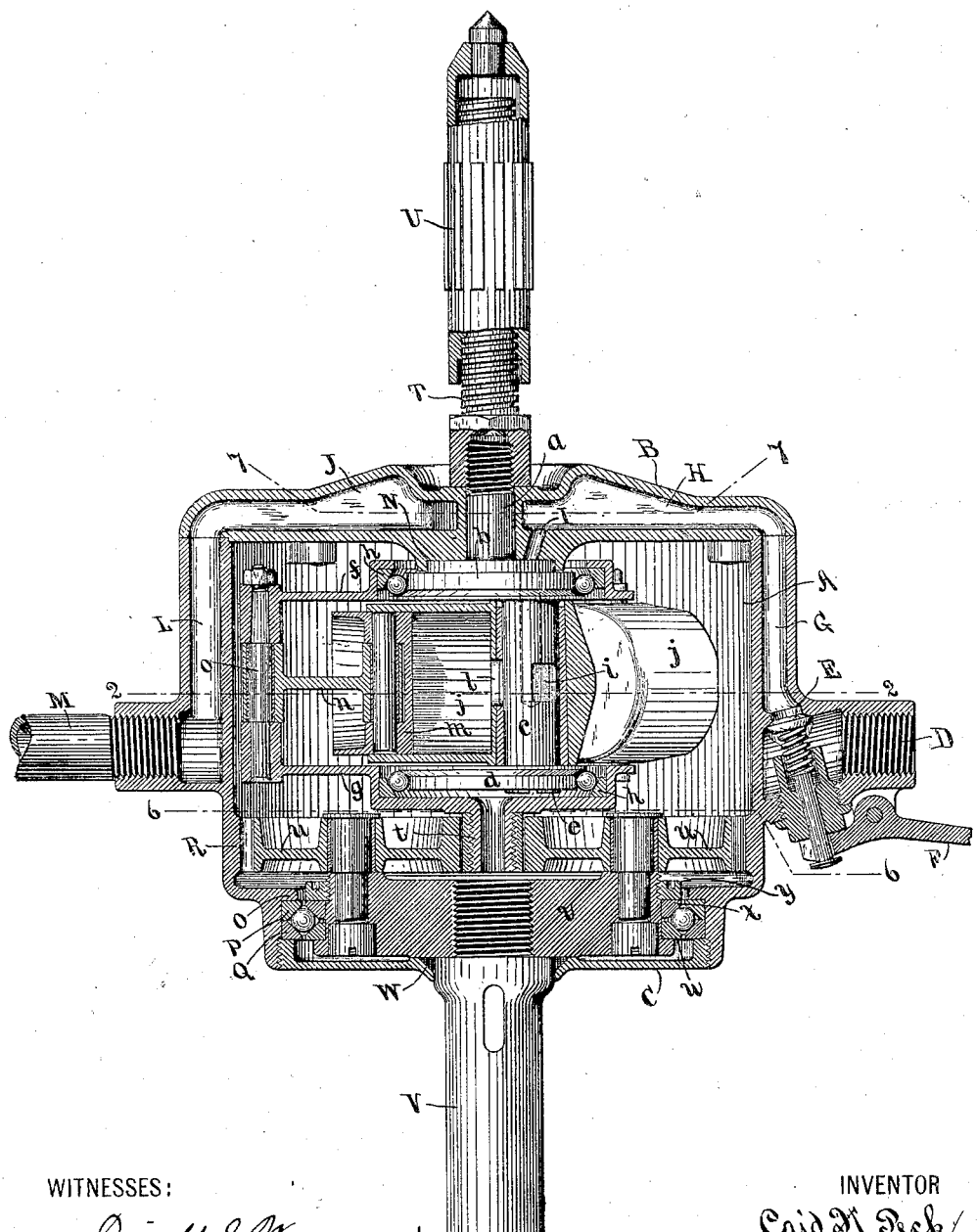

No. 725,127. PATENTED APR. 14, 1903.
C. H. PECK.
MOTOR FOR PORTABLE TOOLS.
APPLICATION FILED JUNE 9, 1902.
NO MODEL. 3 SHEETS—SHEET 1.

WITNESSES:
Dwight S. Wiseman
M. A. Brown.

INVENTOR
Caid H. Peck
BY
Eugene Diven
ATTORNEY

No. 725,127. PATENTED APR. 14, 1903.
C. H. PECK.
MOTOR FOR PORTABLE TOOLS.
APPLICATION FILED JUNE 9, 1902.
NO MODEL. 3 SHEETS—SHEET 2.

WITNESSES:
Dwight S. Wiseman
M. A. Brown

INVENTOR
Caid H. Peck
BY Eugene Diven
ATTORNEY

No. 725,127. PATENTED APR. 14, 1903.
C. H. PECK
MOTOR FOR PORTABLE TOOLS.
APPLICATION FILED JUNE 9, 1902.
NO MODEL. 3 SHEETS—SHEET 3.

WITNESSES: INVENTOR
Dwight S. Wiseman Caid H. Peck
M. A. Brown. BY
Eugene Diven
ATTORNEY

United States Patent Office.

CAID H. PECK, OF ELMIRA, NEW YORK, ASSIGNOR TO IMPERIAL PNEUMATIC TOOL COMPANY, OF ATHENS, PENNSYLVANIA.

MOTOR FOR PORTABLE TOOLS.

SPECIFICATION forming part of Letters Patent No. 725,127, dated April 14, 1903.

Application filed June 9, 1902. Serial No. 110,730. (No model.)

*To all whom it may concern:*

Be it known that I, CAID H. PECK, a citizen of the United States, residing at Elmira, in the county of Chemung and State of New York, have invented certain new and useful Improvements in Motor-Driven Portable Tools, of which the following is a specification.

This invention relates to improvements in portable drills, reamers, and the like intended more especially to be driven by compressed air, although steam or other fluids under pressure may be utilized equally well as the driving power, and the motor to the use of which my improvements particularly relates belongs to that class in which a rotary frame journaled upon fixed bearings is propelled by a plurality of cylinders rotating about a fixed shaft set eccentric to the axis of said bearings, the cylinders and their pistons being so connected to the frame that they will coact with the frame to produce rotation when motive fluid under pressure is admitted to and exhausted from the cylinders by way of suitable passages and ports in the eccentric shaft. Such a motor has already been described by me in my United States Letters Patent No. 641,034, dated January 9, 1900, and as herein shown in an improved form is more fully described and claimed in a copending application, Serial No. 110,731, filed June 9, 1902.

The object of my present invention is to apply said motor to portable tools adapted for drilling and divers other operations.

A further object of my invention is to provide means whereby the motive fluid may be carried to and from the motor without entering the motor-casing, and to so construct the casing that it will hold a lubricant in which the motor and gearing may run partially immersed.

A further object is to provide an improved thrust-bearing for the driving-gears and to so connect said driving-gears to the motor as to render the motor entirely free from pressure due to thrust upon said bearing; and, finally, my object is to provide various improvements in the details of construction to the end that my motor may run more accurately and freely and with increased power and speed within the small compass permissible in this class of tools, as will appear more fully from the following description and be particularly pointed out in the claims.

I attain the above objects by means of the construction and arrangement of parts as illustrated in the accompanying drawings, in which—

Figure 2:
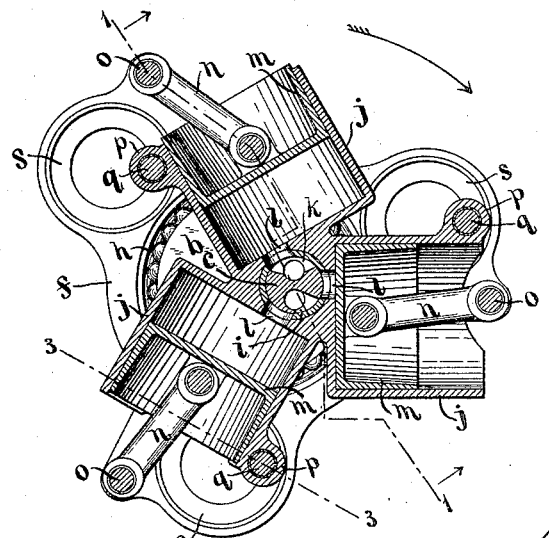
Figure 5:
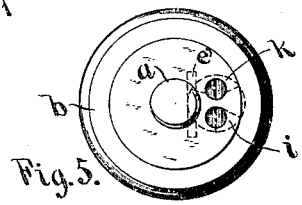
Figure 3:
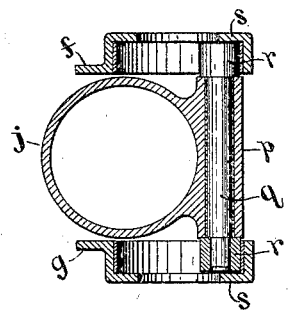
Figure 4:
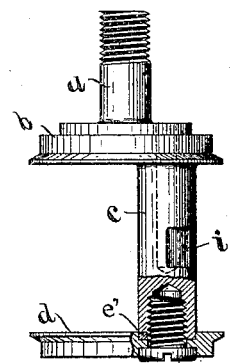
Figure 6:
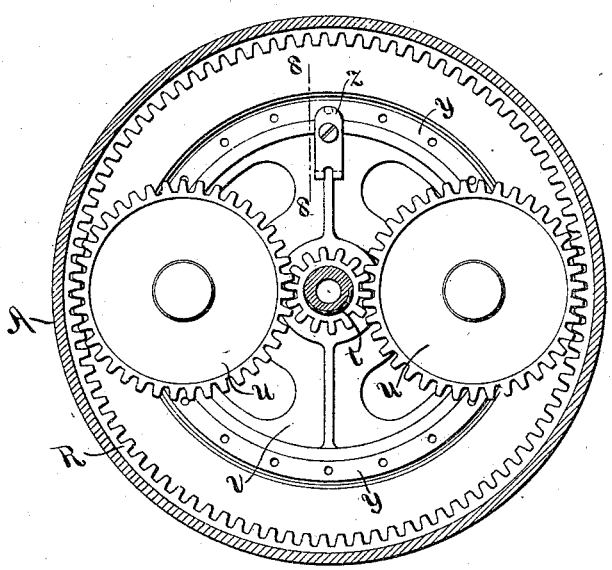
Figure 7:
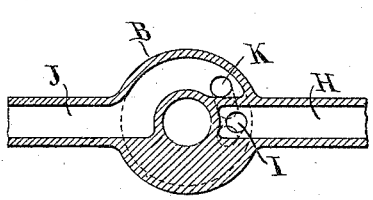
Figure 8:
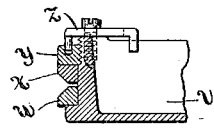

Figure 1 represents a transverse vertical section of my improved motor as applied to a portable drill, the motor proper being shown as sectioned on the line 1 1 in Fig. 2; Fig. 2, a section of the motor-cylinders on the line 2 2 in Fig. 1; Fig. 3, a detail showing a section on the line 3 3 in Fig. 2; Figs. 4 and 5, details showing the supporting-disks and eccentric shaft upon which the motor-cylinders and connections revolve; Fig. 6, a section on the line 6 6 in Fig. 1, showing a plan view of the driving-gearing; Fig. 7, a detail showing a section on line 7 7 in Fig. 1, and Fig. 8 a detail showing a partial section on line 8 8 in Fig. 6.

Like letters of reference designate like parts throughout the several views.

Referring to the drawings, A represents a cylindrical casing provided at one end with a head B, secured thereto by fastening screws or bolts, and at the other end, which is reduced in diameter, by the head or cap C, screwed thereinto. Compressed air or other motive fluid is admitted to the motor within the casing by way of the inlet connection D and passage G at one side of the casing, the admission being controlled by the throttle-valve E, which valve is actuated by a hand-lever F. The passage G communicates with the inlet-passage H, cast in head B, from which latter passage the air is admitted to the motor through the passage I. The exhaust from the motor is delivered to the exhaust-passage J in head B by way of a passage K, (shown in Fig. 7,) and the passage J communicates with the passage L at the opposite side of the casing from the inlet, the exhaust being led away from passage L through the connection M. I have indicated at M a piece of pipe or tubing for carrying off the exhaust, and a similar piece of pipe will be attached at D, to which latter pipe the supply-hose will be coupled, and these two short sections of pipe may serve as handles by which to manipulate the tool in the manner now commonly adopted in portable tools of this type.

The head B on the inside is provided with an annular socket N to receive a reduced portion of the disk b. A stud a, projecting from said disk, passes out through a hole in the head, and said disk and stud are rigidly secured to the head by means of a nut on the end of feed-screw T. The feed-screw T is supplied by the usual sleeve or nut U, by turning which against a suitable bearing block or brace the drill is fed to the work. The stud a and disk b are set concentric with the casing A, and from the disk b projects the integral eccentric shaft c, to the end of which shaft a second disk d is secured by means of a screw e, a key e' being inserted in the disk d where it receives the end of shaft c to prevent said disk from turning on said shaft and to hold it in permanent concentric alinement with disk b. The disks b and d on their inward sides are provided with conical flanges forming the cones for ball-bearings, upon which bearings revolve the frame-plates f and g, said plates being triangular in shape and of peculiar construction, as shown more clearly in Figs. 2, 3, and 9. These plates f and g are provided with hardened ball-races h h, set in the outwardly-projecting cup-like hubs which encircle the disks b and d. The three cylinders j j j radiate from a hub which rotates upon the shaft c, a conical bushing being inserted between the hub and the shaft in order that wear between the parts may be taken up when necessary. This bushing rotates with the hub, and the bushing and hub are provided with registering ports l l l, leading into the cylinders j. The air from passage I is admitted to these cylinders by way of a port i, opening from a passage drilled into the shaft in a position to communicate with said passage I when the parts are assembled, and the air is exhausted from the cylinders by way of the port k, which communicates by way of a similarly-drilled passage with the outlet-passage K in head B, thence passing by way of passage J to the exhaust, outlet.

The pistons m in the cylinders are coupled to connecting-rods n, which in turn are coupled to the bolts o, by which the frame-plates f and g are fastened together. In order that rotary motion may be transmitted from the cylinders to the frame-plates, each of these plates is provided with three annular guideways s in proximity to the bolts o, and each cylinder is provided with a boss p, in which rotates a small shaft or arbor q, the ends of which project beyond the cylinders and are provided with rollers r. These rollers engage the guideways s and act with the piston connections to impart the required relative motions between the cylinders and the frame-plates to give the whole a turning movement, the frame-plates f and g revolving about the central disks and the cylinders revolving about the eccentric shaft. I make the guideways s cup-shaped, so that the inturned flanges form end bearings for the arbors q and prevent side play at the outer ends of the cylinders, thereby keeping the cylinders and their pistons in perfect alinement with the frame-plate connections. By reason of this manner of coupling together the parts the motor is caused to run steadily and freely without vibration or binding. The frame-plates f and g are spaced the required distance apart by shoulders on the bolts o, so that when fastened together the ball-races h will bear against the cones on disks b and d just sufficiently to prevent end play of the said plates upon the disks. As so adjusted the motor will run for an indefinite period of time without further attention to these ball-bearings, and when wear does occur in the bearings it may be readily taken up by inserting paper washers or liners in the hubs on the plates f and g behind the ball-races, so as to set them in toward the cones the required amount. From the center of the hub on plate g projects a short shaft t, to which is screwed or keyed a gear-pinion. This pinion meshes with the gears u u, which are set diametrically opposite one another on the gear-head v, and the gears u u mesh with the internal gear R, formed on the inside of casing A. The gearing is so proportioned in the tool taken for illustration that it will require about six and a half revolutions of the motor to produce one revolution of the gear-head. In other words, the gear-head is geared to the motor in the proportion of 1 to 6.5, and the power imparted from the motor to the tool-spindle V, to which the gear-head is fastened, is in like proportion.

The reduced end of the casing A is provided with an internal shoulder, between which and the head or cap C is a ball-race, which in the present instance is shown as being in two parts P and Q. On the gear-head v, between an external shoulder and an adjustable screw-ring y, are two cone-rings w and x, the cone x being adjusted toward or away from cone w by turning the ring y in one or the other direction. In assembling the parts the ball-races P and Q are first inserted in casing A and set up into place by means of cap C. The gear-head v, carrying the gears u, is then set in place with the spindle V projecting through the cap C and with cone w in position on its shoulder. The balls are then inserted and the cone x placed in position upon the balls, after which the ring y is screwed down until the gear-head v turns freely and without end play. When the ring y is properly adjusted, a clip z is fastened in place on the gear-head with a pin projecting into one of the spanner-holes in the top of the ring to lock the ring in position, this locking device being shown in Figs. 6 and 8. Before placing the gear-head and spindle in position in the cap C a conical washer W, of leather or other suitable material, is placed around the base of the spindle, so as to be compressed in a conical packing-box provided in the cap when the ball-bearing for the gear-head is brought to adjustment. This packing W prevents the escape of oil contained in the casing A at this point where the spindle passes out through the cap C, this being the only opening in the casing where such escape of lubricant is possible.

In the operation of drilling, a drill having been placed in the socket in spindle V and the nut U having been centered in a suitable brace, so as to press the point of the drill against the work, compressed air will be admitted to the motor by throwing open the valve E, the tool having been first coupled to the supply-hose. The air passes through passages G H I into shaft $c$, whence it is admitted by way of the port $i$ to the cylinders $j$ in succession as they rotate about the shaft, and the air is exhausted from the cylinders by way of the port $k$ and the passage through the shaft leading to the passages K J L and the exhaust connection M. The pressure of the air between the cylinders and their pistons causes said cylinders, together with the frame-plates $f$ $g$, to rotate about the shaft and the disks $b$ $d$, respectively. The rotation of the frame-plates imparts motion to the gears $u$ $u$ through the pinion secured to the shaft $t$. The rotation of the gears $u$ $u$ causes them to travel around the gear R on the casing A, thereby imparting motion to the gear-head $v$ and to the drill by way of the spindle V. As the drill is fed to its work the backward thrust will be taken up by the casing through cone $w$, which presses the balls in the gear-head bearing against the portion of the ball-race P, this pressure being transmitted from one part to the other at points where I am able to make the structure the strongest. The cone $x$ and the adjusting-ring $y$, it will be seen, are only required to set up the bearing to prevent end play. As the only connection between the frame-plates $f$ $g$ and the gearing is through the pinion on the shaft $t$, it will be clearly seen that none of the thrust on the gear-head $v$ can be transmitted to said frame-plates, so as to cause them to bind in the least upon their bearings. In other words, said frame-plates run free on their bearings at all times, and the only work required of them is to transmit the rotary motion from the pinion to the gears. This, as I have already stated, renders the motor free-running and materially increases the life of the motor-bearings, since there can be no end thrust upon them. It will be noticed also that the bearings are all large, which increases their durability and renders the tool very smooth-running.

In practice I preferably fill the casing A about one-third full of lubricating-oil, and if, therefore, the tool be held in a vertical position when operating it the gearing will run entirely immersed in the oil. The oil also circulates through the shaft $t$, which I preferably make hollow, into the ball-bearing for the disk $d$. The revolutions of the motor also cause the oil to be thrown about in the casing, so as to lubricate all the other parts, and no matter in what position the tool be held when operating it this continuous lubricating will take place. As the oil cannot escape from the casing, it will last an indefinite length of time, and after it is once placed in the casing no further attention need be paid to the lubrication of the running parts of the tool. By means of these free-running ball-bearings and my ample lubrication I reduce the friction of the running parts to a minimum and utilize the full force of the compressed air to drive the tool, thereby rendering the tool extremely powerful in view of the limited compass allowable.

An inspection of Fig. 1 will show that my entire motor is carried on the head B and removed with it from the casing A. In fact, if air-pressure be applied to passage H when the head is so removed the motor will run just as well as if set in the casing. From this it will be apparent that one motor may be used to drive a number of different kinds of tools by transferring it from one casing to another or by attaching it to the tool or mechanism to be driven without the use of a casing. The head and casing may also be made of skeleton form, if so desired. This latter, however, would preclude running the bearings in a body of lubricant and would necessitate closer attention to the lubrication of the bearings. Finally, this simple removal of the one head B enables me to get at all the working parts of the tool and to make necessary changes, repairs, or adjustments.

Changes in details of construction and modes of application may be made without departing from the spirit of my invention, and I do not, therefore, wish to be understood as confining myself strictly to what I have herein shown and described by way of illustration.

Having thus described my improvements and set out those features which I deem particularly novel, what I claim as my invention, and desire to secure by Letters Patent, is—

1. In a motor-driven tool, the combination of a casing, a head for the casing, admission and exhaust passages leading out from the center of said head, an eccentric shaft set between two disks secured to the head within the casing, a frame rotating upon said disks and a plurality of cylinders within the frame rotating upon the eccentric shaft, connections between the frame and cylinders whereby rotation is imparted from one to the other, ports and passages leading from the cylinders through the eccentric shaft to the admission and exhaust passages in the head, a spindle projecting from the casing in line with said rotating frame, and means for transmitting motion from said frame to the spindle.

2. In a motor-driven tool, the combination of a casing, a casing-head, admission and exhaust passages radiating from the center of said head, a pair of disks having an eccentric shaft between them secured to said head by a stud integral with one of said disks, a feed-screw upon said stud, a rotary frame journaled on said disks, a plurality of cylinders within the frame rotating about said shaft, connections between the cylinders and the frame to impart motion from one to the other, ports and passages leading through the eccentric shaft to the admission and exhaust passages in the head, a spindle projecting from the casing in line with said rotating frame, and means for transmitting motion from said frame to the spindle.

3. In a motor-driven tool, the combination of a casing, a casing-head, an eccentric shaft set between two disks secured to said head within the casing by a stud concentric with said disks, a frame rotating upon said disks, a plurality of cylinders within the frame rotating upon the eccentric shaft, connections between the frame and cylinders whereby rotation is imparted from one to the other, ports and passages leading from the cylinders through the eccentric shaft and the disk adjacent to the head, admission and exhaust passages in the head in communication with said passages from the cylinders, a spindle projecting from the casing in line with the rotating frame, and means for transmitting motion from said frame to the spindle.

4. In a motor-driven tool, the combination of a casing, a motor secured to one head of the casing, a spindle passing out through the other head, a circular gear-head attached to said spindle, a thrust-bearing between the casing and the outer periphery of said gear-head, and a train of gears between the gear-head and the motor.

5. In a motor-driven tool, the combination of an oil-containing casing, a motor secured to one head of the casing, admission and exhaust passages leading thereto exterior to the casing, a spindle passing out through a packing in the other casing-head, a circular gear-head attached to said spindle, a bearing between the casing and the outer periphery of said gear-head, and a train of gears between the gear-head and the motor, the motor-bearing, gears and gear-head bearing being open to the lubricant contained within the casing.

6. The combination of a casing, a head closing one end of the casing, a motor secured to said head, admission and exhaust ports and passages to and from the motor, a screw-cap closing the other end of the casing, a spindle projecting through the cap, a circular gear-head on the spindle, a train of gears between the gear-head and the motor, and a ball-bearing for the outer periphery of the gear-head comprising a ball-race secured to the casing between a shoulder therein and said cap, a pair of cones on the periphery of the gear-head and means for adjusting one of said cones.

7. The combination within a casing of a motor, a circular gear-head, a train of gears between the gear-head and the motor, and a ball-bearing between the casing and the outer periphery of the gear-head comprising a ball-race on the casing, cones on the periphery of the gear-head, one of said cones being adjustable, a screw-ring to adjust said cone, and means for locking said ring from turning upon the head.

8. The combination within a casing of a motor, a circular gear-head, a train of gears between the gear-head and the motor, a ball-bearing between the casing and the outer periphery of the gear-head, a spindle projecting from the gear-head through the casing, a conical packing-box around the spindle and a conical washer compressed therein when the ball-bearing is adjusted.

9. The combination within a casing of a motor, a circular gear-head, a bearing between the casing and the outer periphery of the gear-head, an internal gear on the casing adjacent to said bearing, gears on the gear-head meshing with the casing-gear, and a pinion on the motor meshing with said gears.

10. The combination of a casing, a head to close one end of the casing, a motor secured to said head, an internal gear on the casing near its other end, a circular gear-head, a thrust-bearing between the outer periphery of the gear-head and casing, a cap to close the end of the casing, a spindle passing through the cap from the gear-head, gears carried by the gear-head meshing with the casing-gear, and a pinion on the motor meshing with said gears.

11. The combination of a casing, a screw-cap closing one end of the casing, a ball-race held between said cap and a shoulder on the casing, a gear-head carrying a pair of diametrically opposite gears set into the casing against said cap, cones on the periphery of the gear-head in register with said ball-race, means for adjusting one of the cones after the balls are in place, an internal gear on the casing with which the gears on the gear-head are adapted to mesh, a head to close the other end of the casing, a motor secured to said head and a pinion driven by said motor and adapted to slip into mesh with said gears when the head is in place.

In testimony whereof I have affixed my signature in presence of two witnesses.

CAID H. PECK.

Witnesses:
A. S. DIVEN,
M. E. VERBECK.